(12) United States Patent
Feistel

(10) Patent No.: US 6,378,875 B1
(45) Date of Patent: *Apr. 30, 2002

(54) SEALING RING

(75) Inventor: Norbert Feistel, Winterthur (CH)

(73) Assignee: Maschinenfabrik Sulzer-Burckhardt AG, Basel (CH)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/983,061

(22) PCT Filed: Jun. 4, 1996

(86) PCT No.: PCT/CH96/00216

§ 371 Date: Dec. 12, 1997

§ 102(e) Date: Dec. 12, 1997

(87) PCT Pub. No.: WO97/00397

PCT Pub. Date: Jan. 3, 1997

(30) Foreign Application Priority Data

Jun. 14, 1995 (EP) ............................. 95810402

(51) Int. Cl.⁷ ................................ F16J 15/40
(52) U.S. Cl. ................ 277/493; 277/435; 277/489; 277/493
(58) Field of Search ................ 277/435, 447, 277/448, 489, 491, 492, 493, 943, 944, 945, 946

(56) References Cited

U.S. PATENT DOCUMENTS

| 1,772,968 A | * | 8/1930 | Badeker ............... 277/435 |
| 1,967,573 A | * | 7/1934 | Fox ....................... 309/29 |
| 2,846,281 A | | 8/1958 | Szigeti ................. 309/46 |
| 3,490,774 A | * | 1/1970 | Henry et al. .......... 277/58 |
| 3,784,215 A | * | 1/1974 | Ruthenberg .......... 277/220 |
| 3,893,675 A | * | 7/1975 | Geffroy ............... 277/436 |
| 3,942,806 A | * | 3/1976 | Edlund ................. 277/165 |
| 4,408,767 A | * | 10/1983 | Kako .................... 277/435 |
| 4,877,257 A | * | 10/1989 | Ide ....................... 277/206 |

FOREIGN PATENT DOCUMENTS

| CH | 439 897 | 12/1967 |
| DE | 7318583 | 7/1975 |
| DE | 4201246 C2 | 12/1993 |
| FR | 490 322 | 4/1919 |
| GB | 429814 | 6/1935 |

\* cited by examiner

*Primary Examiner*—Anthony Knight
*Assistant Examiner*—Enoch E Peavey
(74) *Attorney, Agent, or Firm*—Townsend and Townsend and Crew LLP

(57) ABSTRACT

The invention relates to a sealing ring for sealing a piston rod of a piston compressor. The sealing ring comprises three segments, wherein the segments have portions extending in the circumferential direction of the sealing ring, which form an overlapping joint. The overlapping joint brings about an excellent sealing effect in the axial direction.

13 Claims, 4 Drawing Sheets

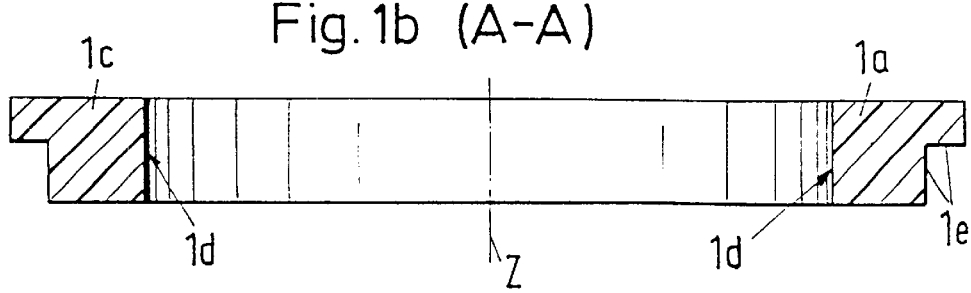
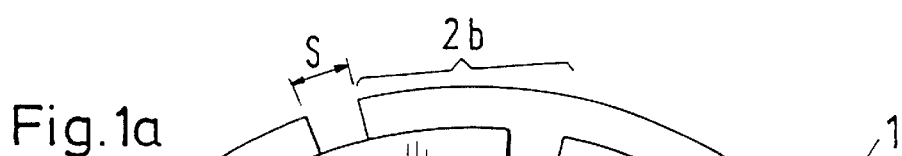
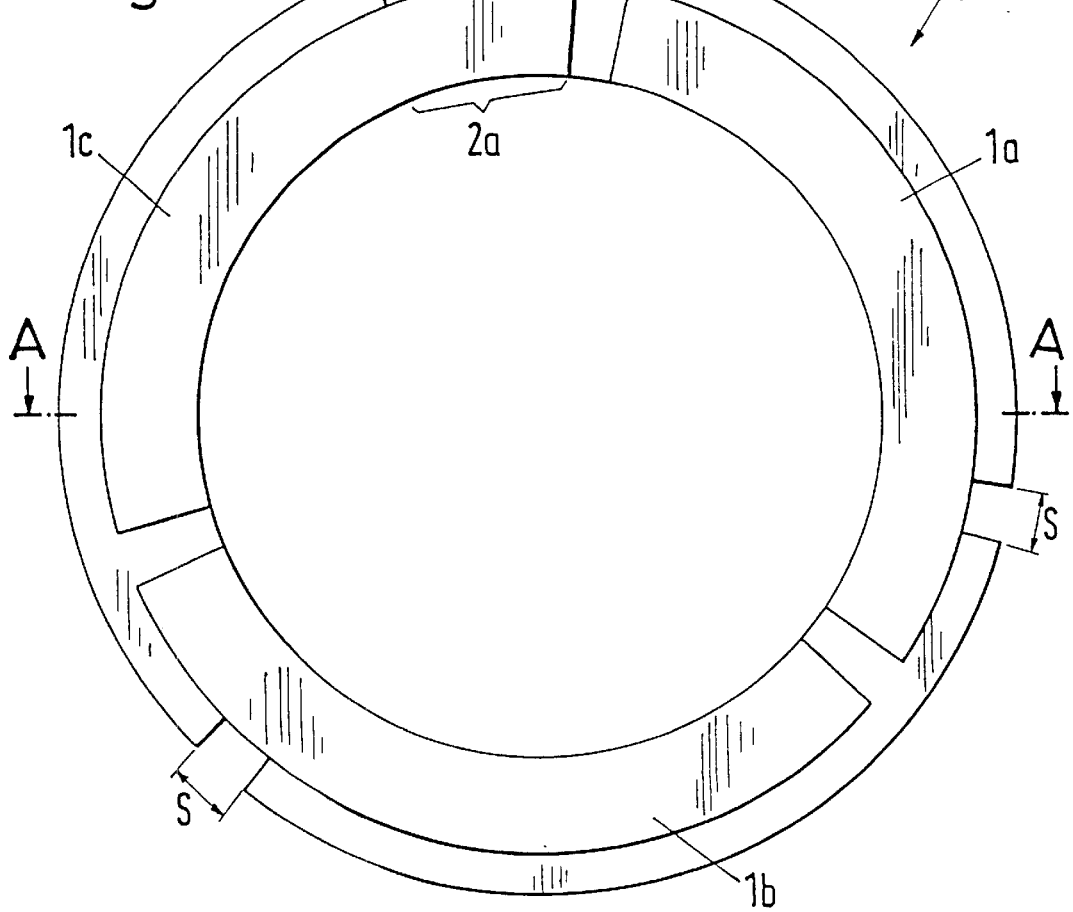
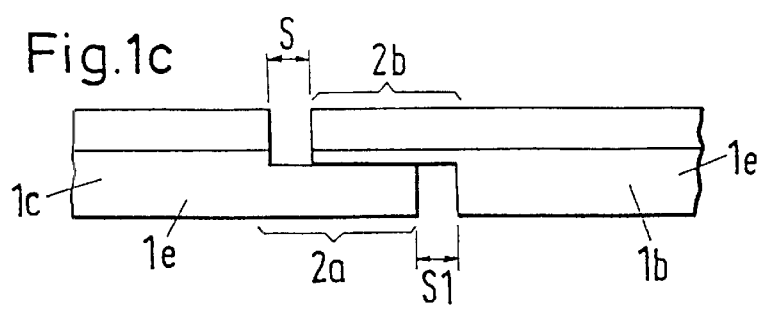

SEALING RING

BACKGROUND OF THE INVENTION

1. Field of the Invention

The invention relates to a sealing ring that comprises at least two segments running in a circumferential direction forming an overlapping joint.

2. Description of the Prior Art

A multiple-part sealing ring made up of three ring segments is known from the patent CH 439 897. The gaps of the ring segments form a through slot extending in the axial direction. Such sealing rings are usually arranged in pairs in series one behind the other and form a so-called packing, in order to seal the sliding surface of a body which is to be sealed, for example, a piston rod of a piston compressor. This known sealing ring has the disadvantage that to seal the through-slot in the axial direction, two sealing rings are respectively to be arranged in pairs adjacent one another. A further disadvantage is to be seen in that a pair of sealing rings arranged adjacent one another has a relatively large extent in the axial direction, which brings about an increased frictional heat. This frictional heat is moreover difficult to dissipate because the sealing ring is usually manufactured from plastic and has a low thermal conductivity, which prevents the transport of heat from the body to be sealed to an external cooling device.

It is the object of the present invention to propose a sealing ring which overcomes these disadvantages.

SUMMARY OF THE INVENTION

The sealing ring in accordance with the invention comprises a multiple part ring, which is formed by at least two ring segments, wherein the ring segments have mutual joints, which are formed overlapping in the circumferential direction of the sealing ring.

An advantage of the sealing ring in accordance with the invention is to be seen in the fact that adjacent ring segments respectively have a mutually overlapping joint, so that no straight through-slot is present between the ring segments in a direction extending vertically to the sealing ring, or as the case may be, in a direction axial to the body to be sealed. A sealing ring of this kind has an excellent seal. In a further advantageous embodiment of the sealing ring in accordance with the invention, a cover ring is arranged extending circumferentially externally about the ring segments, which covers over the joints extending between the ring segments in a radial direction from the outside and by this means seals them. The cover ring also serves to mutually stabilize the ring segments. A spring extending in the circumferential direction is advantageously arranged lying on the cover ring at the outside, as for example, a hose spring, or toroidal spring, in order to exert a force acting radially inwardly on the ring segments. The cover ring can, moreover, have a connecting element cooperating with one of the ring segments, in order to prevent a rotation of the cover ring relative to the individual ring segments.

With regard to a rod which is to be sealed, a sealing ring can be developed in such a manner that the individual ring segments have a mutual clearance extending in the circumferential direction of the sealing ring. The sealing ring undergoes progressive wear during the operation on the surface facing the rod. The sealing ring in accordance with the invention has the advantage that, due to the clearance between the individual ring segments and also the hose spring surrounding the sealing ring, the ring segments are constantly subjected to a force acting in a radial direction towards the rod, so that during the progressive wear, the clearance between the ring segments is constantly reduced, wherein the ring segments contact the rod and maintain their sealing function. Moreover, the sealing function of the sealing ring is maintained in the axial direction by means of the overlapping joints.

The portions of the ring segments overlapping one another are designed in such a manner that even when the clearance to one or more of the adjacent ring segments becomes zero, the remaining adjacent ring segments still have portions with overlapping joints. It is thereby ensured that a leakage at the joints in the axial direction does not occur at any position of the ring segments.

A sealing ring comprising at least two ring segments as well as a cover ring extending circumferentially at the outside has the advantage that, due to the combination of overlapping joint and circumferentially extending cover ring at the outside, a very good sealing action in the axial direction results, and also that only a single sealing ring is required for sealing in the axial direction, so that the sealing ring has a low constructional height in the axial direction. A further advantage of the sealing ring in accordance with the invention is to be seen in that a relatively stiff material can also be used as material for the ring segments, so that a high temperature polymer, such as, for example, modified PEEK can also be used as a material for the ring segments.

In a further advantageous embodiment, the sealing ring in accordance with the invention is designed in such a way that the mutual ring segments have no mutual clearance, with the diameter of the rod to be sealed being chosen in such a way, that a split ring seal results between the sealing ring and the rod. In a sealing ring designed in this way, the ring segments can also be made of a ceramic material, wherein the cover ring surrounding the ring segments in a circumferential direction is still made of a plastic.

A further advantage of the sealing ring is to be seen in the fact that due to its type of construction an installation of the ring with an already installed piston rod is possible and not problematic.

The following drawings describe a particular embodiment of the invention. They show:

BRIEF DESCRIPTION OF THE DRAWINGS

FIG. 1a is a view of a multiple part sealing ring;

FIG. 1b is a section along the line A—A in accordance with FIG. 1a;

FIG. 1c is a side view of a joint between two annular segments;

DETAILED DESCRIPTION OF THE PREFERRED EXEMPLARY EMBODIMENTS

Figure 1D:
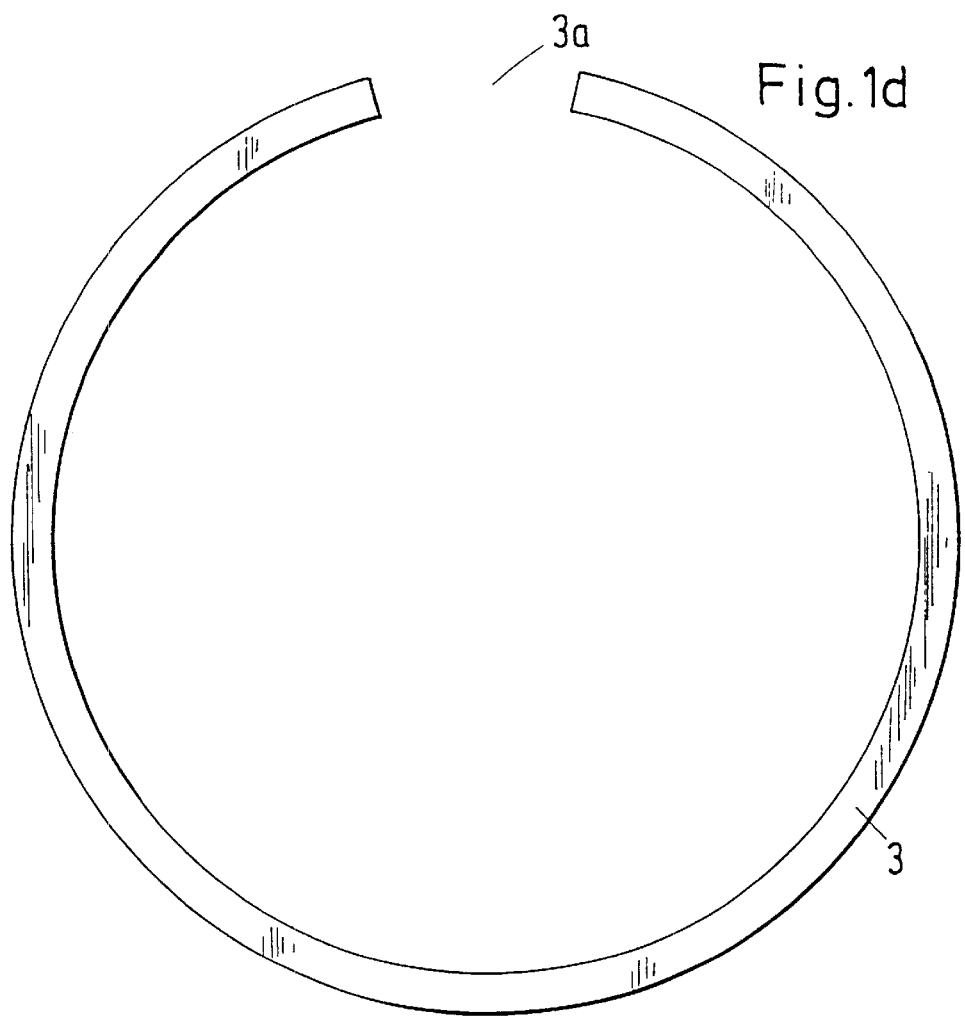
FIG. 1d is a plan view of a circumferentially extending cover ring.

FIG. 1a shows a sealing ring 1 designed as a multiple part ring with three ring segments 1a, 1b, 1c. The individual ring segments 1a, 1b, 1c have mutual joints, with a mutual clearance S, extending in the circumferential direction of the sealing ring 1. The segments 1a, 1b, 1c have portions 2a, 2b extending in the circumferential direction, which form an overlapping joint. FIG. 1b shows a section through FIG. 1a along the line A—A. The ring segments 1a, 1c have a sliding surface 1d oriented towards the center Z of the sealing ring, which lies on the surface to be sealed with circular cross-section, for example of a piston rod or is spaced from it by a small distance. In the present embodiment, the ring segments 1a, 1c are developed in an L-shape in the illustrated cross-section and have a rectangular recess 1e. This recess 1e serves to receive a cover ring 3 illustrated in FIG. 1d, which is designed in such a way from the point of view of its dimensions that it has a cross-section corresponding to the recess 1e, so that the cover ring 3 can be inserted into this recess 1e. The cover ring can have spring elastic characteristics and is laid over the sealing ring 1 in such a manner that it surrounds the individual ring segments 1a, 1b, 1c lying in the recess 1e in the circumferential direction. The cover ring has, as illustrated in FIG. 1d, a cut-out portion 3a. Furthermore, the cover ring 3 can be surrounded by a hose spring extending in the circumferential direction. This spring exerts a force on the ring segments working towards the center Z. In the special embodiment, according to FIG. 1a, the ring segments 1a, 1b, 1c have joints extending in the radial direction. The cover ring 3 seals the gap or joint extending between the segments in a radial direction. The spring tension has the effect that the ring segments lie on the piston rod, so that on wear of the sealing surface 1d, the clearance S between the individual ring segments 1a, 1b, 1c is reduced. A sealing ring of this kind having a joint clearance of >0 is also termed as a friction ring.

So long as the sealing ring 1 has a clearance S between the segments 1a, 1b, 1c, it is possible that the clearance between the individual segments 1a, 1b, 1c can be of different widths. In an extreme case, two joints have a joint clearance=0, so that the clearance S becomes very large at a third joint. The portions 2a, 2b extending in the circumferential direction of the sealing ring 1 are advantageously designed in such a way that, even in the named extreme case, they mutually overlap and have a sealing effect in the axial direction.

Figure 1E:
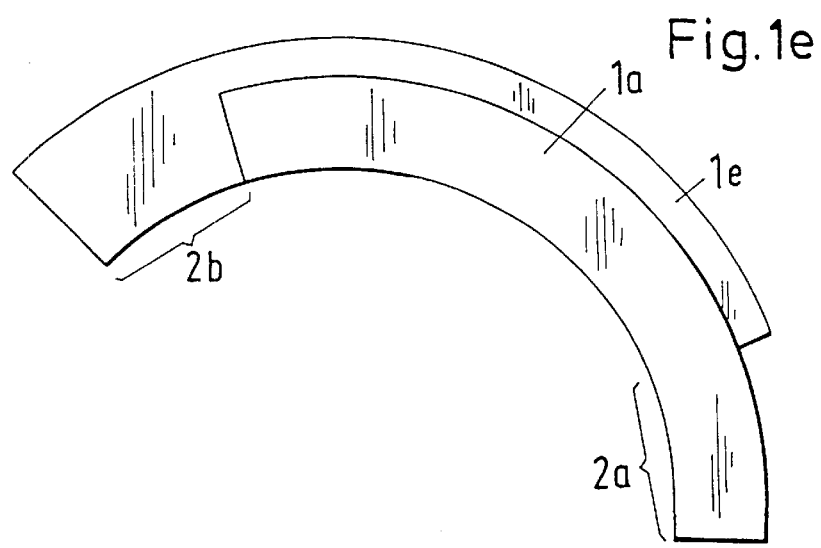
FIG. 1e is a plan view of an ring segment of the sealing ring.

In FIG. 1c, a side view is shown of a joint between two ring segments 1b, 1c with portions 2a, 2b extending in the circumferential direction of the sealing ring 1. The gap widths S, S1 can have the same or also a different width. The ring segments 1b, 1c have a recess 1e for a sealing ring 3. FIG. 1e shows a single ring segment 1a with recess 1e, as well as the two portions 2a, 2b. Essential to the invention is the aspect that the joints 2a, 2b of ring segments lying adjacent one another overlap in the circumferential direction of the sealing ring 1. Otherwise the joints 2a, 2b can be designed in a plurality of ways, in order to effect a sealing function in the axial direction, as well as a clearance S in the circumferential direction of the sealing ring 1. Likewise the recess 1e can be designed in a variety of ways, in order to receive a cover ring 3, or in order to receive a hose spring directly and without a cover ring 3. The sealing ring 1 can also be formed without a recess 1e, comprising, as illustrated in FIG. 1, merely of three or more ring segments 1a, 1b, 1c.

Figure 1F:
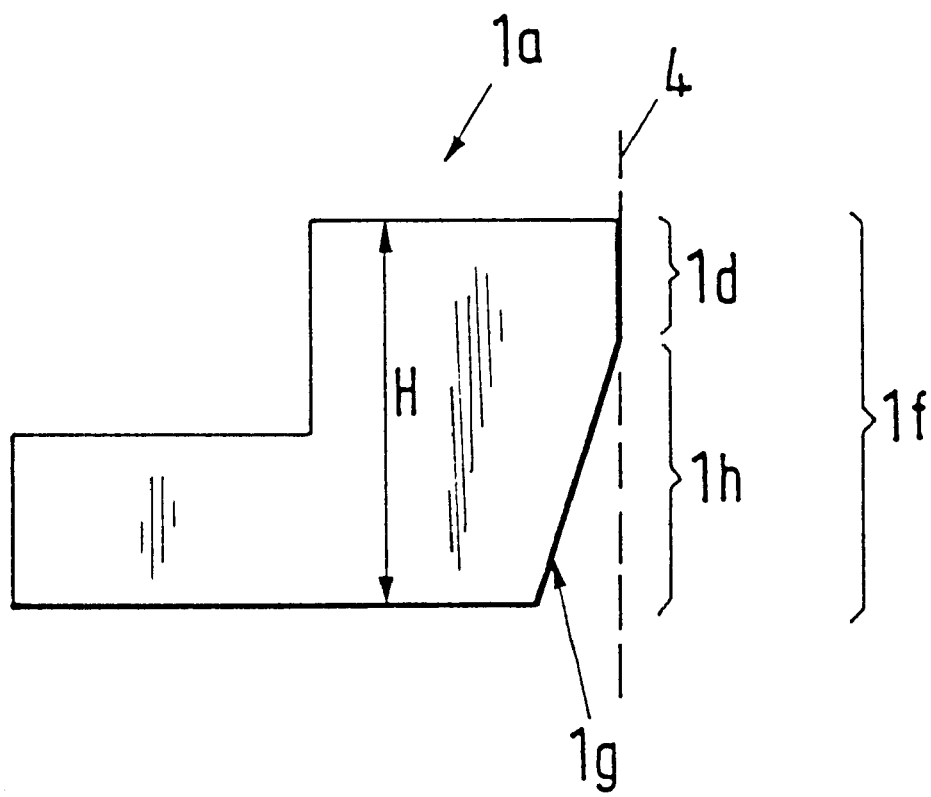
FIG. 1f is a further particular embodiment of a section along the line A—A through an ring segment.
Figure 2:
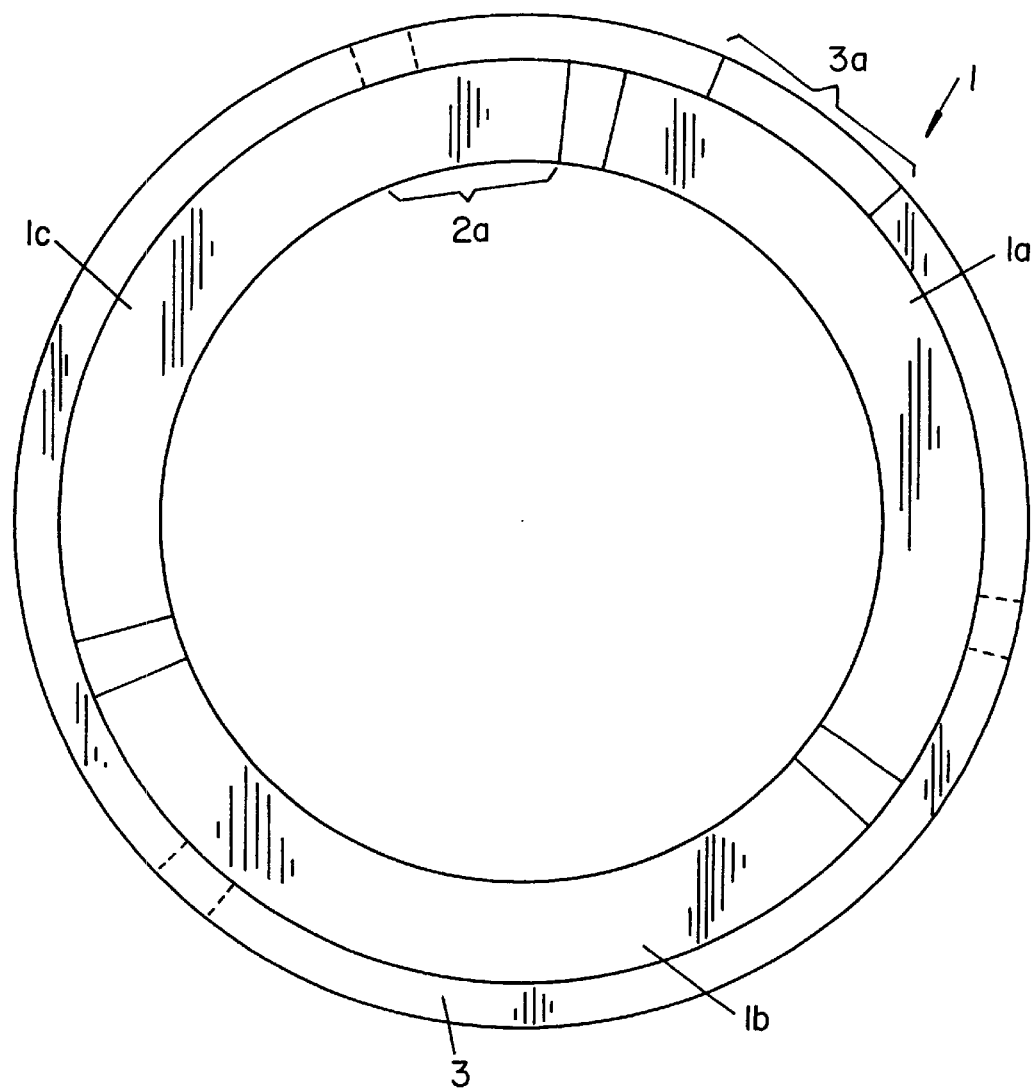
FIG. 2 is an elevation view illustrating the cover ring surrounding segments in a circumferential directoin of the sealing ring and sealing the joint in a radial direction.

FIG. 1f shows a section through an ring segment, for example along the line A—A, in accordance with FIG. 1a with a further design alternative of the cross-section. The ring segment 1a has a surface if orientated towards a sliding surface 4, executed as a piston rod. This surface if has a height H in the axial direction and is designed to extend cylindrically across one part 1d, in order to form a sealing surface 1d and designed to diverge over a further part 1h.

The divergent surface 1g can, for example, be conically designed. The sealing ring 1 in accordance with the invention, has an excellent sealing action, since a through-flow is prevented both in the axial and also in the circumferential direction. Thus, gas components escape predominantly between the sealing surface 1d and the sliding surface 4, which has the advantage that the sealing ring 1 is slightly lifted from the sliding surface 4 and thus, that the friction is reduced. The divergent surface 1g has the effect that the gas components flow freely in the direction of the reduced sealing surface 1d in accordance with FIG. 1f, wherein the gas components not only exert a force acting outwardly in the radial direction on the sealing ring 1, both on the surface 1g and also on the surface 1d. Thus, the leakage between the sealing surface 1d and the sliding surface 4 of a piston rod is favored, wherein the gas bearing of the sealing element is improved.

The ring segments 1a, 1b, 1c may be manufactured from different materials, in particular, from plastics such as polytetrafluoroethylene (PTFE), a modified high temperature polymer such as poly(ether ether ketone) (PEEK), poly (ether ketone) (PEK), polyimide (PI), poly(phenylene sulfide) (PPS), polybenzimidazole (PBI), polyamideimide (PAI) or a modified epoxy resin. The high temperature polymers are plastics which are not suitable for dry running in their pure form, so that additional solid lubricants, such as for example, carbon, graphite, molybdenum sulfide or PTFE are necessary.

In a further special embodiment, starting from a pre-given diameter of a piston rod, the sealing ring is designed in such a way that the individual segments surround the piston rod without a clearance S, in other words, with a joint clearance= 0. A seal of this kind is termed as a gap ring seal. In an embodiment of this kind, the ring segments can also be manufactured from a ceramic material, wherein the cover ring surrounding the segments consists further of plastic. An optimum sealing effect of a sealing ring is achieved by a joint which is just closed, in other words, with a joint clearance=0. In this situation, there is no contact pressure of the segments on the piston rod, so that no friction occurs. Moreover the leakage is minimal, since no gap is opened. This condition can be maintained over a long period with ring segments made of ceramic material, since any kind of contact which occurs with the piston rod does not lead to wear. The segments are inherently stable moreover, so that the segments are not deformed under the applied pressure difference. At the same time care must be taken that no appreciable high surface pressure or lengthy contacts between the segment and the piston rod occur. With a joint clearance=0, the radial, axial joints between the segments are very close, so that the leakage between the sealing surface 1d and the sliding surface 4 of the piston rod occurs and thus a gas bearing forms. In an advantageous embodiment, the ceramic segment has a cross-section as illustrated in FIG. 1f. The reduced sealing surface 1d, as well as the divergent surface 1g assist the leakage bringing about a gas bearing.

What is claimed is:

1. A sealing ring comprising at least two segments wherein the segments have portions running in a circumferential direction of the sealing ring, which form an overlapping joint, consisting of an upper portion and a lower portion lying one on top of the other, the sealing ring further comprising a cover ring that surrounds the segments in a circumferential direction of the sealing ring and seals the joint in a radial direction.

2. A sealing ring in accordance with claim 1, wherein the ring segments have a L-shaped cross-section, such that they have a recess in which the cover ring is inserted.

3. A sealing ring in accordance with claim 1, wherein the portions are formed in such a way that two adjacent segments have a mutual clearance (S) in a circumferential direction of the sealing ring.

4. A sealing ring in accordance with claim 3, wherein the portions are designed in such a way that if one or more adjacent segments have a mutual clearance of S=0, the portions of the remaining adjacent segments still form overlapping joints.

5. A sealing ring in accordance with claim 4, wherein the portions are developed in such a way that adjacent segments are arranged in a circumferential direction of the sealing ring next to one another without clearance.

6. A sealing ring in accordance with claim 5, wherein the segments are manufactured from a ceramic material.

7. A sealing ring in accordance with claim 1, wherein the segments are manufactured from one of plastic, a modified high temperature polymer, or a modified epoxy resin.

8. A sealing ring in accordance with claim 7, wherein the segments are manufactured from one of polytetrafluroetheylene (PTFE), poly (ether ether ketone) (PEEK), poly(ether ketone) (PEK), polyimide (PI), poly(phenylene sulfide) (PPS), polybenzimidazole (PBI), or polyamideimide (PAI).

9. A sealing ring in accordance with claim 1, wherein the sealing ring has spring elastic characteristics or is surrounded by a spring lying on the sealing ring running in a circumferential direction of the sealing ring.

10. A sealing ring in accordance with claim 1, wherein the segments have a first surface oriented towards a sliding surface which is to be sealed, wherein the first surface has a height (H) extending in a direction perpendicular to a circumferential direction of the sealing ring, wherein the first surface is formed in a cylinder shape across one part of the height (H), in order to form a sealing surface, and that across a further part it has a second surface with an enlarged radius in relation to the sealing surface.

11. A sealing ring in accordance with claim 10, wherein the surface is formed to conically widen across a further part.

12. A packing to seal the sliding surface of a body with a sealing ring in accordance with claim 1.

13. A piston compressor comprising a sealing ring, the sealing ring comprising:

at least two segments, wherein the segments have portions running in a circumferential direction of the sealing ring, which form an overlapping joint; consisting of an upper portion and a lower portion lying one on top of the other the sealing ring further comprising a cover ring that surrounds the segments in a circumferential direction of the sealing ring and seals the joint in a radial direction.

* * * * *